(12) United States Patent
Hara (10) Patent No.: US 7,499,029 B2
(45) Date of Patent: Mar. 3, 2009

(54) INFORMATION PROCESSING APPARATUS WITH DOUBLE-SIDED OPERABLE KEYBOARD

(75) Inventor: Yasushi Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/638,557

(22) Filed: Aug. 12, 2003

(65) Prior Publication Data

US 2005/0035948 A1 Feb. 17, 2005

Related U.S. Application Data

(63) Continuation-in-part of application No. 10/331,502, filed on Dec. 31, 2002, now abandoned.

(30) Foreign Application Priority Data

Aug. 2, 2002 (JP) ............................. 2002-226441

(51) Int. Cl.
*G09G 5/00* (2006.01)
(52) U.S. Cl. ...................... 345/168; 345/169
(58) Field of Classification Search .......... 345/168–172
See application file for complete search history.

(56) References Cited

U.S. PATENT DOCUMENTS

| | | | |
|---|---|---|---|
| 5,559,531 A | | 9/1996 | Schiffer |
| 5,710,576 A | * | 1/1998 | Nishiyama et al. ........... 345/169 |
| 5,768,164 A | * | 6/1998 | Hollon, Jr. .................. 708/174 |
| 6,028,764 A | * | 2/2000 | Richardson et al. ......... 361/681 |
| 6,396,475 B1 | * | 5/2002 | Ellenby et al. .............. 345/156 |
| 6,630,925 B1 | | 10/2003 | Östergård et al. ........... 345/168 |
| 6,798,882 B2 | | 9/2004 | Kupiainen |

FOREIGN PATENT DOCUMENTS

| | | |
|---|---|---|
| JP | 60-95624 | 5/1985 |
| JP | 63-147720 | 9/1988 |

(Continued)

OTHER PUBLICATIONS

U.S. Appl. No. 10/331,502, filed Dec. 31, 2002, Yasushi Hara, Fujitsu Limited.

(Continued)

*Primary Examiner*—Jimmy H Nguyen
(74) *Attorney, Agent, or Firm*—Staas & Halsey LLP (57) ABSTRACT

There is provided an information processing apparatus with a double-sided operable keyboard, capable of executing desired application processing even in the case where a keyboard is folded and keys to be normally operated are directed to a reverse side (e.g., a display apparatus side or a lower side) with respect to a user. The information processing apparatus includes a display apparatus and a keyboard apparatus. The keyboard apparatus is foldable so as to cover a lower part or a portion of a display region of the display apparatus, and at least one function key assigned arbitrary applications are provided on a bottom surface of the keyboard apparatus. Furthermore, the information processing apparatus includes a keyboard position detecting part for detecting a relative position of the keyboard apparatus with respect to the display apparatus, and switches effective keys between keys on an upper surface of the keyboard apparatus and keys on the bottom surface of the keyboard apparatus in accordance with the relative position of the keyboard apparatus.

20 Claims, 8 Drawing Sheets

FOREIGN PATENT DOCUMENTS

| | | |
|---|---|---|
| JP | 4-205215 | 7/1992 |
| JP | 7-1533 | 1/1995 |
| JP | 10-31571 | 2/1998 |
| JP | 11-512890 | 11/1999 |
| JP | 11-338575 | 12/1999 |
| JP | 2000-148359 | 5/2000 |
| JP | 2000-259970 | 9/2000 |
| JP | 2002-51138 | 2/2002 |
| JP | 2002-171314 | 6/2002 |
| JP | 2002-197939 | 7/2002 |

OTHER PUBLICATIONS

Public Technical Report by Japan Institute of Invention and Innovation, vol. 8-4, No. 83-965, Feb. 21, 1983.

\* cited by examiner

INFORMATION PROCESSING APPARATUS WITH DOUBLE-SIDED OPERABLE KEYBOARD

This application is a Continuation-in-Part (CIP) of application number 10-331,502, filed Dec. 31, 2002, now abandoned.

BACKGROUND OF THE INVENTION

1. Field of the Invention

The present invention relates to an information processing apparatus with a double-sided operable keyboard, capable of executing desired application processing even in a folded state.

2. Description of the Related Art

Due to the recent rapid spread of personal computers, an environment is increasing in which personal computers are used in a similar manner to that of electrical appliances even in general households. However, most of the personal computers are composed of a display apparatus, a computer body, and a keyboard apparatus, so that it is difficult to keep a space for setting a computer in individual households.

In order to solve the problem regarding such a setting space, for example, JP 2000-259970 A discloses a method for ensuring a use environment of a personal computer without wasting a living space by providing a cavity on a wall surface in a household and setting a personal computer therein.

However, in view of the housing situation in this country, only some households can provide a cavity on a wall surface. Therefore, this cannot be actually a solution to the above problem. Recently, some models have started coming on the market, which has a configuration with a foldable keyboard and is intended to effectively use a space at least during a period of time when computers are not being used.

However, merely with the configuration with a foldable keyboard, the following problems arise.

First, when a keyboard is folded, a personal computer cannot be operated. In the existing circumstance, it takes a considerable amount of time to start up or terminate an operating system, so that it is considered to provide a resume function. This undermines the reason for making a keyboard foldable.

The following is also considered: function keys are arranged on the periphery of a display screen in a configuration where a keyboard is foldable on the display screen, whereby any application may be operated even when the keyboard is folded. However, in this case, irrespective of whether the keyboard is folded or not, the function keys are effective, making an operation complicated to a user, which may cause malfunction.

SUMMARY OF THE INVENTION

Therefore, with the foregoing in mind, it is an object of the present invention to provide an information processing apparatus with a double-sided operable keyboard, capable of executing desired application processing even in the case where a keyboard is folded and keys to be normally operated are directed to a reverse side (e.g., a display apparatus side) with respect to a user.

In order to achieve the above-mentioned object, an information processing apparatus with a double-sided operable keyboard of the present invention includes a display apparatus and a keyboard apparatus, wherein the keyboard apparatus is foldable so as to cover a lower part or a portion of a display region in the display apparatus, and a bottom surface of the keyboard apparatus is provided with at least one function key assigned an arbitrary application.

Because of the above configuration, even in the case where a keyboard is folded, and keys to be normally operated are directed to the display apparatus, desired application processing can be executed by the operation of function keys.

The function keys are arbitrarily assigned applications. One function key may be assigned one application. A plurality of function keys may be assigned different functions of one application. One function key may be assigned at least two applications.

Furthermore, it is preferable that the information processing apparatus with a double-sided operable keyboard of the present invention includes a keyboard position detecting part for detecting a relative position of the keyboard apparatus with respect to the display apparatus, thereby switching effective keys between keys on an upper surface of the keyboard apparatus and keys on a bottom surface of the keyboard apparatus, in accordance with the relative position of the keyboard apparatus. Malfunction between the keys on the upper surface of the keyboard apparatus and those on the bottom surface thereof can be prevented, and key malfunction due to the shock during folding can be prevented.

Furthermore, in the information processing apparatus with a double-sided operable keyboard of the present invention, it is preferable that the keyboard position detecting part detects a tilt angle between the keyboard apparatus and a display part of the display apparatus. This is because the information processing apparatus normally includes a rotation part for folding the keyboard apparatus at the bottom of an information processing apparatus body.

In the information processing apparatus with a double-sided operable keyboard according to the present invention, the keyboard apparatus may be used in at least two states including a first state in which the keyboard apparatus is folded so as to cover the lower part or the portion of the display region in the display apparatus and a second state in which the keyboard apparatus is removed from the display apparatus so that a surface with at least one function key formed thereon is placed upward. In the second state, the keyboard apparatus and the information processing apparatus may be connected to each other via a cable, or data may be transmitted/received therebetween by radio communication.

Furthermore, in the above aspect, it is preferable that the keyboard apparatus is capable of being used even in a third state in which the keyboard apparatus is removed from the display apparatus so that a surface with the at least one function key formed thereon is placed downward, the keyboard apparatus includes a keyboard posture detecting part for detecting which surface of the keyboard apparatus is an upper surface, and the information processing apparatus includes an input control part for switching effective keys between keys on the upper surface of the keyboard apparatus and keys on the bottom surface of the keyboard apparatus, in accordance with detection results of the keyboard posture detecting part. The reason for this is as follows. For example, by setting keys on the upper surface to be effective and setting keys on the bottom surface to be ineffective, erroneous operation of keys can be prevented when a user uses the keyboard apparatus on the lap or the like.

Furthermore, in the above configuration, it is also preferable that the information processing apparatus further includes a display control part for displaying contents of assignment to the at least one function key in the display apparatus, only in a case where a surface having the at least one function key is detected to be an upper surface of the keyboard apparatus by the keyboard posture detecting part.

According to this configuration, a user can easily understand the operation of the function keys.

In the information processing apparatus with a double-sided operable keyboard according to the present invention, it is preferable that start functions of at least one application are assigned to the at least one function key on the bottom surface of the keyboard apparatus.

In the information processing apparatus with a double-sided operable keyboard according to the present invention, it is also preferable that after one application is started, operation functions with respect to the application are assigned to the at least one function key on the bottom surface of the keyboard apparatus.

Furthermore, it is preferable that the information processing apparatus with a double-sided operable keyboard according to the present invention further includes a display control part for displaying contents of assignment to the at least one function key on the bottom surface of the keyboard apparatus in the display apparatus. According to this configuration, a user can easily understand the operation of the function keys.

Furthermore, the information processing apparatus with a double-sided operable keyboard according to the present invention can be realized as a wall-hung type or a desktop type As described above, in the information processing apparatus with a double-sided operable keyboard according to the present invention, by folding a keyboard or turning it upside down, even in the case where keys to be normally operated are directed to the display apparatus side or keys are directed downside, desired application processing can be performed by operating the function keys.

These and other advantages of the present invention will become apparent to those skilled in the art upon reading and understanding the following detailed description with reference to the accompanying figures.

DESCRIPTION OF THE PREFERRED EMBODIMENTS

Hereinafter, an information processing apparatus with a double-sided operable keyboard of an embodiment according to the present invention will be described with reference to the drawings.

Embodiment 1

Figure 1A:
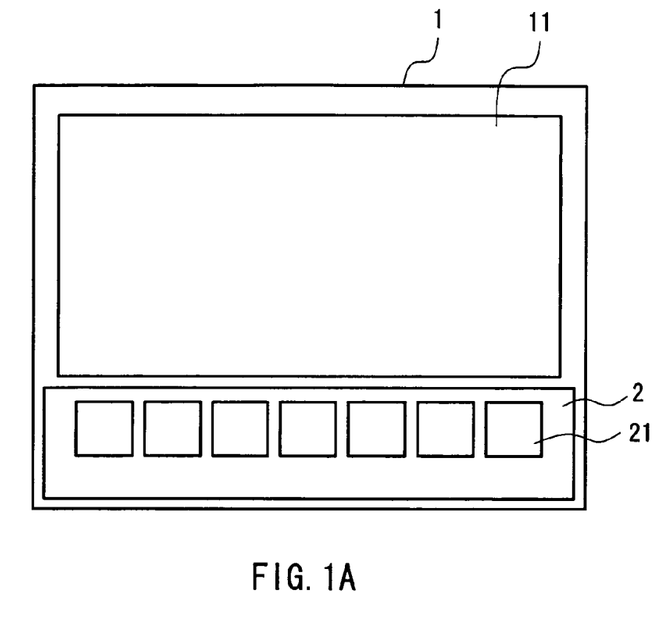
FIG. 1A is a front view showing a configuration of an information processing apparatus with a double-sided operable keyboard of one embodiment according to the present invention.
Figure 1B:
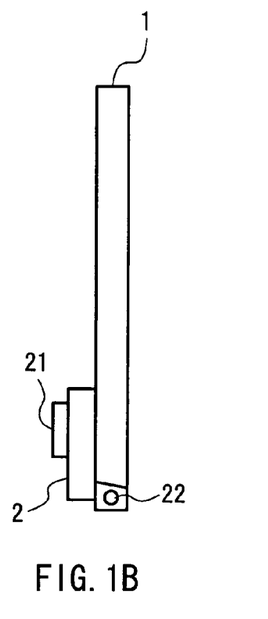
FIG. 1B is a right side view thereof.

FIGS. 1A and 1B are views showing a configuration of an information processing apparatus with a double-sided operable keyboard of an embodiment according to the present invention. FIG. 1A shows a front view of the information processing apparatus with a double-sided operable keyboard of the embodiment according to the present invention. FIG. 1B shows a right side view of the information processing apparatus with a double-sided operable keyboard of the embodiment according to the present invention.

In the present embodiment, the case where the information processing apparatus is thin and can be wall-hung will be described. Needless to say, the configuration of the information processing apparatus is not particularly limited thereto.

In FIG. 1A, reference numeral 11 denotes a display region in an information processing apparatus body 1, and a liquid crystal screen or the like is used often for a display of the thin information processing apparatus 1. Reference numeral 2 denotes a keyboard apparatus. As shown in FIG. 1B, the keyboard apparatus 2 is folded toward the display region 11 by using a rotation part 22. In this state, function keys 21 are operable on a surface directed in the same direction as that of the display region 11 of the keyboard apparatus 2.

Figure 2A:
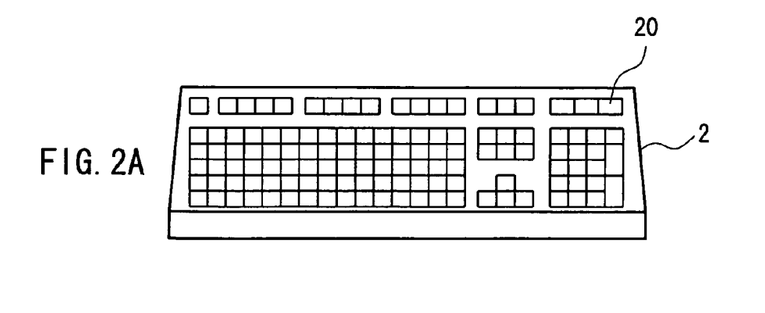
FIG. 2A is a perspective view of a surface, on which a key set is provided, of a keyboard apparatus in the information processing apparatus with a double-sided operable keyboard of one embodiment according to the present invention.
Figure 2B:
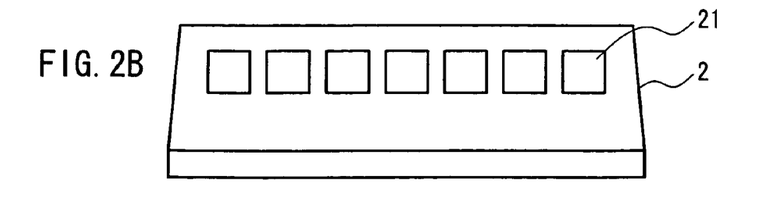
FIG. 2B is a perspective view of a surface of the keyboard apparatus on which function keys are provided.

FIGS. 2A and 2B show a configuration of the keyboard apparatus 2 in the information processing apparatus with a double-sided operable keyboard of the embodiment according to the present invention. FIG. 2A shows a plan view of the keyboard apparatus 2 in the information processing apparatus with a double-sided operable keyboard of the embodiment according to the present invention. FIG. 2B shows a bottom view of the keyboard apparatus 2 in the information processing apparatus with a double-sided operable keyboard of the embodiment according to the present invention.

As shown in FIG. 2A, keys 20 (hereinafter, referred to as "upper surface keys") similar to those of a normal keyboard apparatus are arranged on an upper surface of the keyboard apparatus 2. There is no particular constraint to the height of the upper surface keys. The height of the upper surface keys only need to be in such a range as that the keyboard apparatus 2 can be folded with respect to the rotation part 22.

Furthermore, as shown in FIG. 2B, the bottom surface of the keyboard apparatus 2 has a configuration in which function keys 21 provided with particular functions are arranged so that any application can be operated even in the case where the keyboard apparatus 2 is folded with respect to the rotation part 22.

Figure 3:
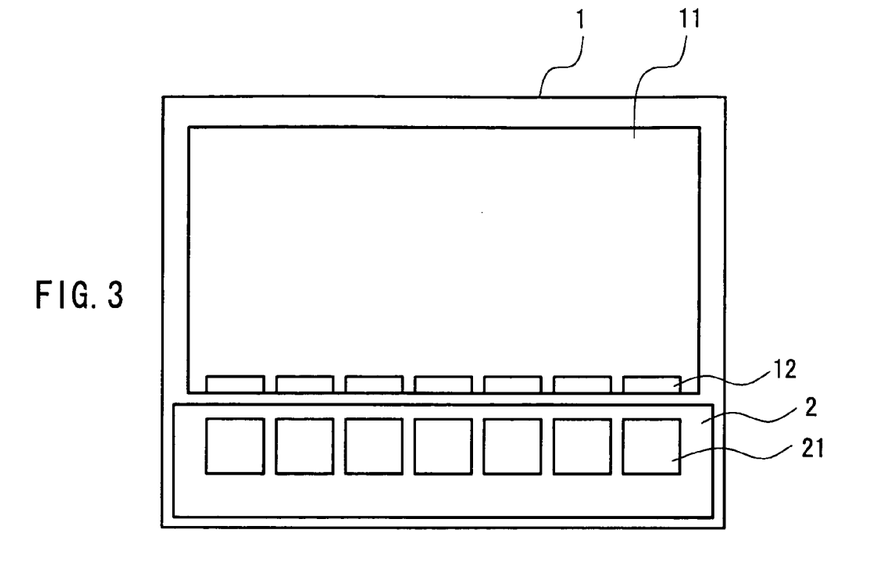
FIG. 3 is a front view showing an exemplary configuration of the information processing apparatus with a double-sided operable keyboard of one embodiment according to the present invention.

As a method for confirming which function is assigned to which function key 21 under the condition that the keyboard apparatus 2 is folded, various methods are considered. For example, as shown in FIG. 3, it is considered that a key display region 12 showing functions assigned to the respective function keys 21 in a folded state is provided in a lower part of the display region 11. Needless to say, the present invention is not limited to such a display method. Any method may be used as long as it clearly demonstrates which function is assigned to which function key 21 positioned on the bottom surface of the keyboard apparatus 2.

Figure 4:
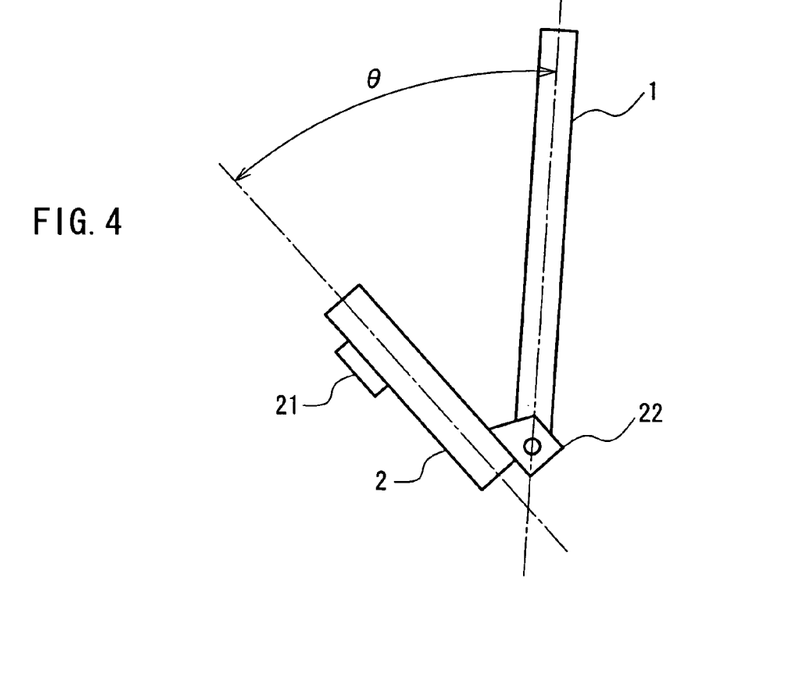
FIG. 4 is a schematic view showing an example of the detection of a keyboard position in the information processing apparatus with a double-sided operable keyboard of one embodiment according to the present invention.

It is also considered that a keyboard position detecting part (described later) is provided for detecting an angle between the keyboard apparatus 2 and the information processing apparatus body 1 including the display region 11 at all times, whereby effective keys are switched between the upper surface keys 20 of the keyboard apparatus 2 or the function keys 21 on the bottom surface in accordance with an angle. More specifically, as shown in FIG. 4, an angle θ between the keyboard apparatus 2 and the information processing apparatus body 1 including the display region 11 is detected at all times. For example, in the case where θ is smaller than 45°, only the function keys 21 on the bottom surface of the keyboard apparatus 2 become effective, and in the case where θ is equal to or larger than 45°, the upper surface keys 20 of the keyboard apparatus 2 become effective.

With such a configuration, malfunction can be prevented when the upper surface keys 20 of the folded keyboard apparatus 2 are pressed with a pressure pressing the reverse surface. Furthermore, malfunction can be prevented when the upper surface keys 20 of the keyboard apparatus 2 are pressed due to the shock during folding.

Hereinafter, the specific example will be described with reference to FIGS. 5A and 5B, and FIGS. 6A to 6C, in which the key display region 12 of functions assigned to the respective function keys 21 is provided in a lower part of the display region 11 under the condition that the keyboard apparatus 2 is folded.

Figure 5A:
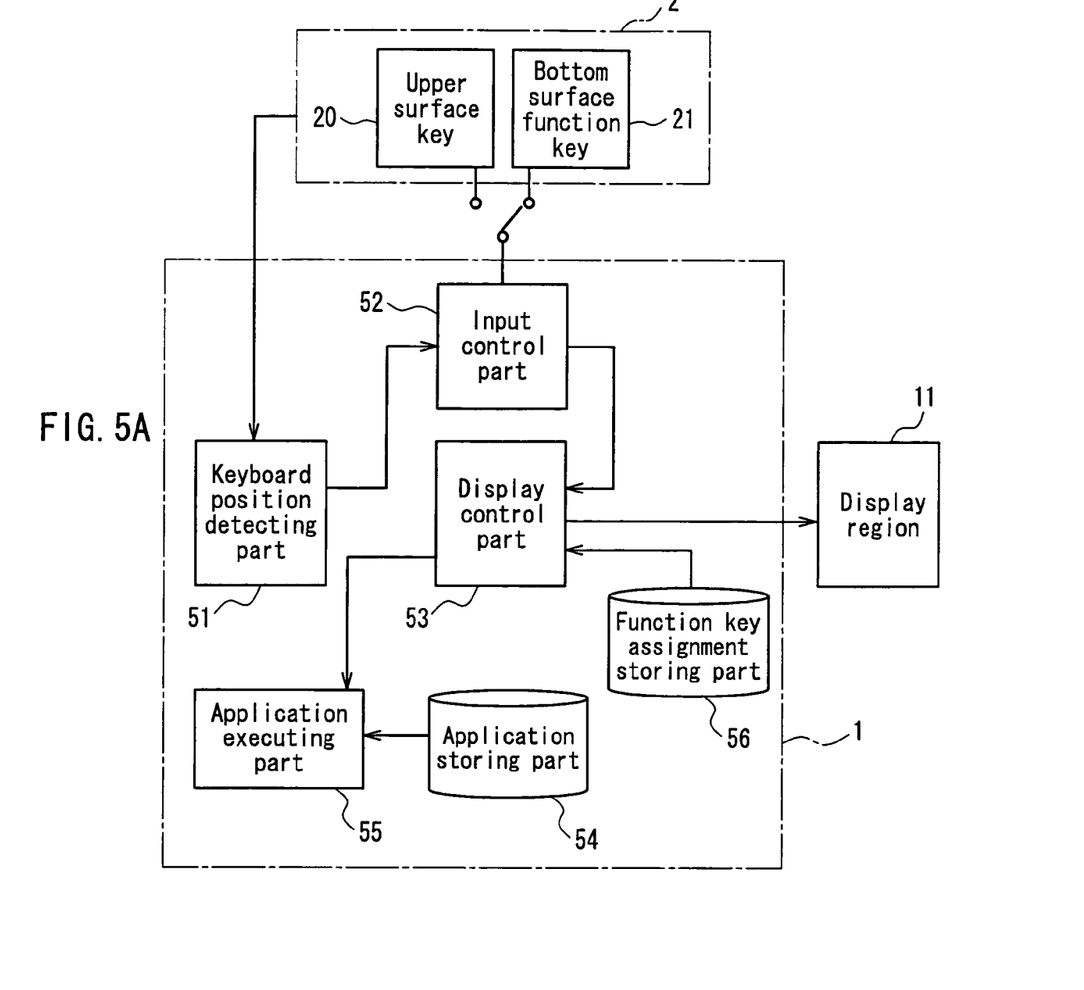
FIG. 5A is a block diagram showing an internal schematic configuration of the information processing apparatus with a double-sided operable keyboard of one embodiment according to the present invention.
Figure 6:
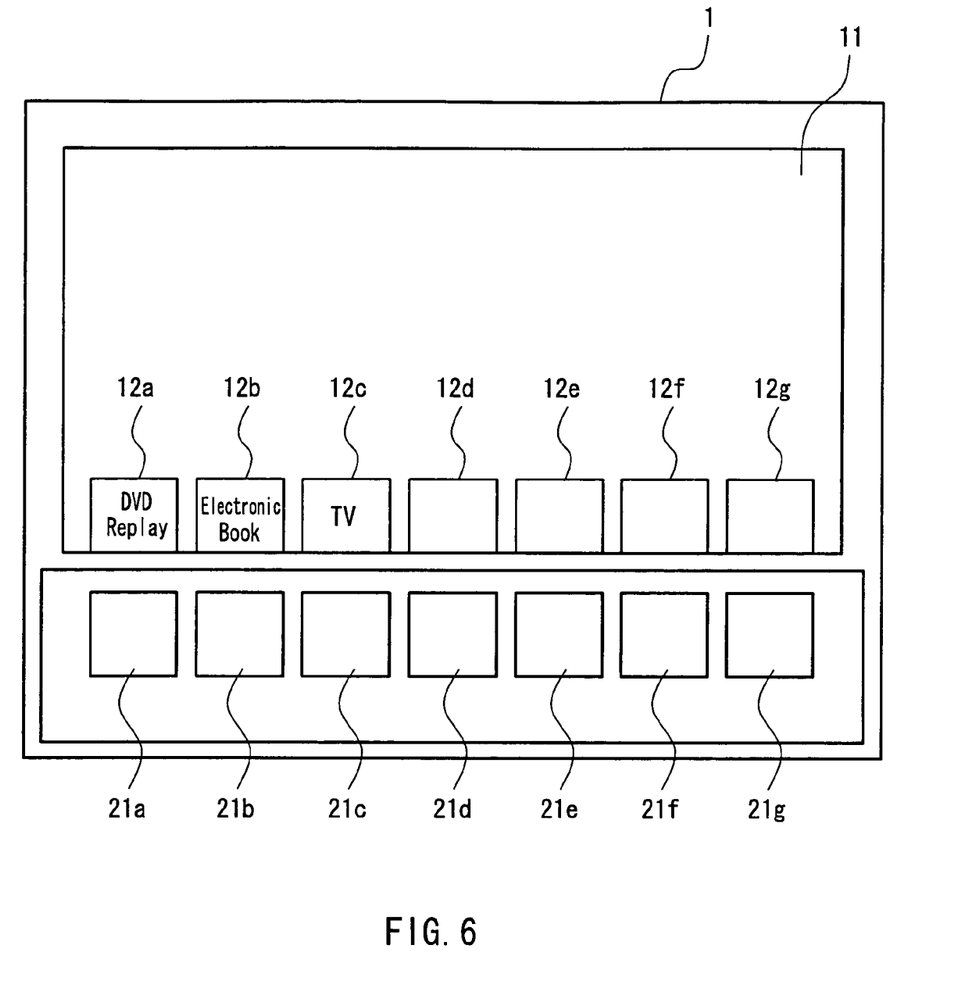
FIG. 6 is a front view showing an exemplary configuration of the information processing apparatus with a double-sided operable keyboard of one embodiment according to the present invention.

FIG. 5A is a block diagram showing an exemplary internal configuration of the information processing apparatus of the present embodiment. As shown in FIG. 5A, the information processing apparatus includes a keyboard position detecting part 51, an input control part 52, a display control part 53, an application storing part 54, an application executing part 55, and a function key assignment storing part 56 in the information processing apparatus body 1. FIG. 5A shows a schematic configuration of a functional block related to the present invention in the internal configuration of the information processing apparatus, and, in addition, the information processing apparatus may include an arbitrary functional block and hardware device (e.g., a DVD drive for realizing a DVD replay function described later) in accordance with the function, purpose, and the like required in the information processing apparatus. FIG. 5A shows the input control part 52, the display control part 53, and the application executing part 55 by separate functional blocks. However, there is a possibility that at least two of them may be realized by the identical hardware (e.g., a microcomputer).

As described above, the keyboard position detecting part 51 detects an angle θ between the keyboard apparatus 2 and the information processing apparatus body 1 including the display region 11 at all times. In the case where the angle θ detected by the keyboard position detecting part 51 is smaller than 45°, for example, the input control part 52 enables only the function keys 21 on the bottom surface of the keyboard apparatus 2. In the case where the angle θ is equal to or more than 45°, the input control part 52 enables only the upper surface keys 20 of the keyboard apparatus 2. The value of the angle θ for switching effective keys between the upper surface keys 20 and the function keys 21 is not limited to the above-mentioned 45°, and may be set at an appropriately angle.

The display control part 53 controls the display in the display region 11 based on the detection results of the keyboard position detecting part 51 and the input data sent from the input control part 52. The application storing part 54 stores an application program to be executed in the information processing apparatus. The application executing part 55 executes an application program extracted from the application storing part 54.

The function key assignment storing part 56 stores information related to the assignment of applications with respect to the respective function keys 21. This information includes those which are previously registered in accordance with preinstalled applications before delivery of the information processing apparatus and those which are registered in accordance with the needs of a user (for example, in the case where a new application is installed in the information processing apparatus).

Figure 5B:
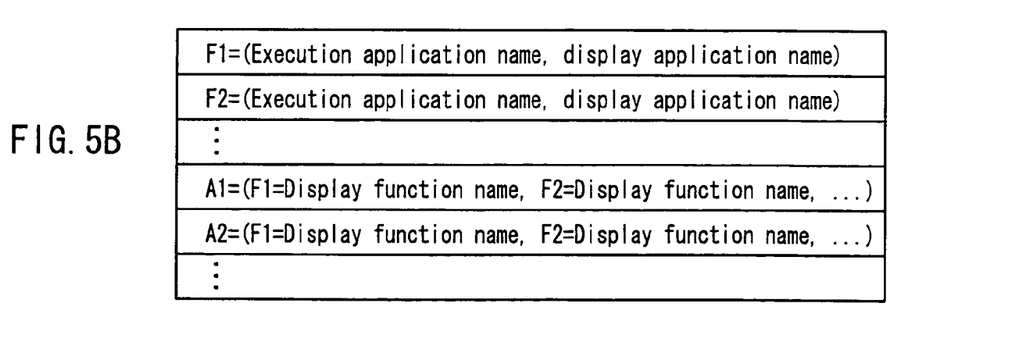
FIG. 5B is an explanatory view showing an example of memory contents of function key assignment storing part shown in FIG. 5A.

FIG. 5B shows an example of a format of information stored in the function key assignment storing part 56. This format is merely an example, and any format can be used. In the example shown in FIG. 5B, F1 to Fn correspond to n pieces (n is a natural number) of function keys 21a, 21b, . . . , and an "execution application name" and a "display application name" in the case where each function key is pressed are respectively described in F1 to Fn. The "execution application name" is an application name in an execution form (or a path to the corresponding application) to be revoked and executed from the application storing part 54 when the function key is pressed. The "display application name" is an application name to be displayed in a key display region of the display region 11.

A1 to An correspond to n pieces of applications stored in the application storing part 54, and "display function names" corresponding to the function keys 21a, 21b, . . . are respectively described in Al to An. The "display function name" represents which function of an application is to be executed when each function key is pressed in the case where the application has been started. Actually, in the case where a code of a function key is not given to the application (in the case where the application does not correspond to the function key), a code for operating the application as well as a display function name may be specified in each column of A1 to An.

In the information processing apparatus, in the case where the power is turned on under the condition that the keyboard apparatus 2 is folded or in the case where the keyboard apparatus 2 is folded from the state where the keyboard apparatus is opened with respect the display region 11 under the condition that the power is on, the keyboard position detecting part 51 detects this, and enables only the function keys 21 on the bottom surface of the keyboard apparatus 2. At this time, the display control part 53 refers to the function key assignment storing part 56, and displays the names of applications to be started by pressing any of function keys 21a to 21g in the display region 11, as shown in FIG. 6. The application names are preferably displayed so as to correspond to the positions of the function keys as shown in FIG. 6. However, as long as a user can understand the correspondence between the application names and the function keys, any display position and display form can be used.

In the example shown in FIG. 6, the key display regions 12a to 12g corresponding to the respective function keys 21a to 21g are provided in a lower part of the display region 11. "DVD Replay" is displayed in the key display region 12a, which represents that an application for replaying a DVD is started when the function key 21a is pressed. Similarly, "Electronic Book" is displayed in the key display region 12b, which represents that an application for browsing the electronic book is started when the function key 21b is pressed. "TV" is displayed in the key display region 12c, which represents that an application for watching a TV broadcast is started when the function key 21c is pressed. More specifically, in this state, the function keys 21a to 21g are assigned different applications. The screen display shown in FIG. 6 is merely an example. The kind and number of applications, and the display form of application kinds are not limited thereto. For example, the display with symbols may be possible, instead of the display with characters.

When a user presses, for example, the function key 21a, the input control part 52 detects that the function key 21a has been pressed, and notifies the display control part 53 that the function key 21a has been pressed. The display control part 53 extracts an execution application name of an application i.e., DVD replay application in this case) corresponding to the function key 21a. The application executing part 55 receives the extracted execution application name, extracts an application program thereof from the application storing part 54, and executes it.

When the application executing part 55 starts executing the application program, the display control part 53 extracts assignment information ("display function name" assigned to each function key) of the function key corresponding to the executed application. Then, the display control part 53 changes the display of the display region 11 to the contents in accordance with the application thereof, and changes the assignment of the functions with respect to the function keys 21a to 21g to the contents in accordance with the application. More specifically, after an application is started, at least one function regarding the execution of the application is assigned to at least one of function keys 2la to 21g.

Figure 7A:
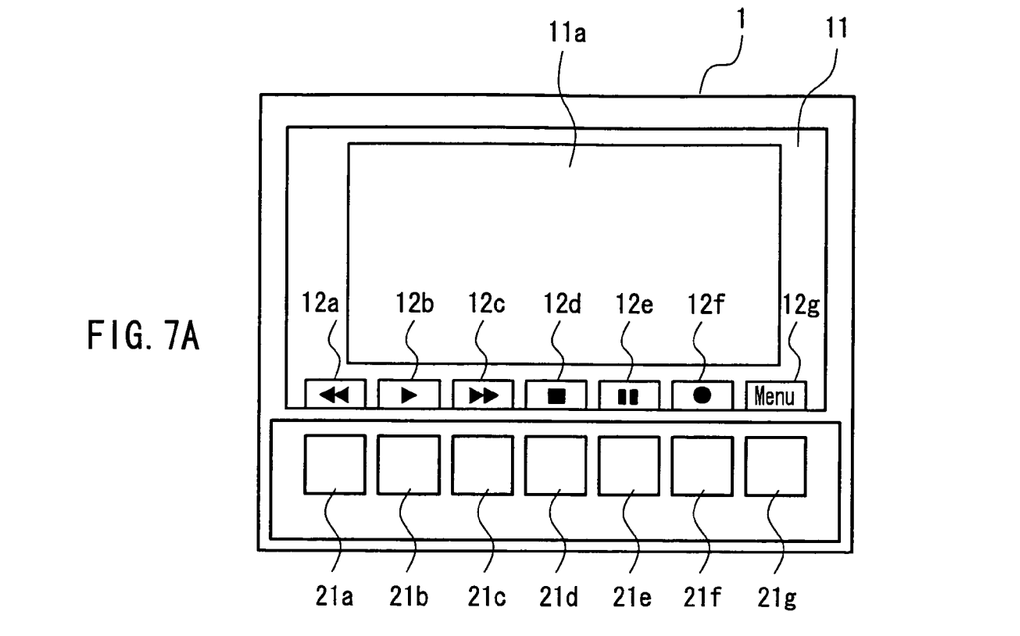
FIGS. 7A and 7B are front views showing an exemplary configuration of the information processing apparatus with a double-sided operable keyboard of one embodiment according to the present invention.

For example, in the case where the executed application is a DVD replay application, the display control part 53 displays a contents video replayed from the DVD in an application region 11a in the display region 11, and assigns functions for a user to control the replay operation of the DVD to the respective function keys 21a to 21g, as shown in FIG. 7A. Furthermore, in the display control part 53, the key display regions 12a to 12g representing the functions assigned to the function keys 21a to 21g are provided in a lower part of the display region 11.

In the example shown in FIG. 7A, the key display regions 12a to 12g represent that the function keys 21a to 21g are assigned a playback function, a replay start function, a fast-forward function, etc. That is, in this state, when a user presses, for example, the function key 21b, the application executing part 55 starts replaying DVD contents. The function key 21g is assigned a menu function. It may be possible to set the menu function so that a starting menu of another application is displayed, a setting screen for changing the functions assigned to the function keys 21a to 21g is displayed, etc. when the function key 21g is pressed.

Figure 7B:
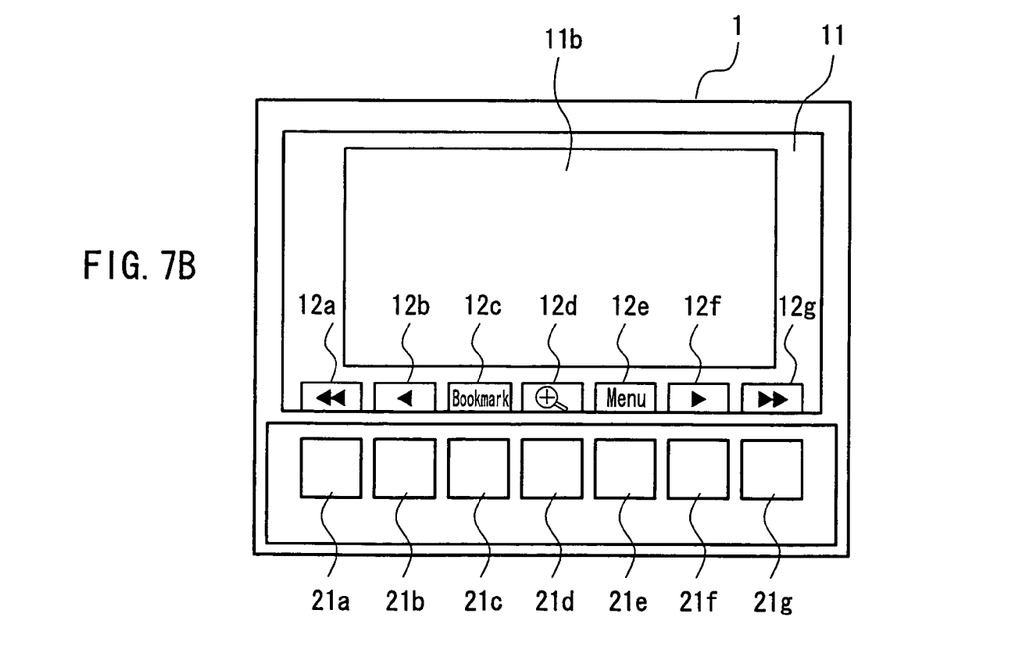

FIG. 7B shows an exemplary screen displayed after a user presses the function key 12b that starts the "Electronic Book" application in the screen shown in FIG. 6. In this case, the display control part 53 displays text and images that are the contents in the electronic book in the application region 11b in the display region 11, and assigns the functions for a user to control the browsing operation of the electronic book to the respective function keys 21a to 21g. Furthermore, the display control part 53 provides the key display regions 12a to 12g representing the functions assigned to the function keys 21a to 21g in a lower part of the display region 11. In the example shown in FIG. 7B, the key display regions 12a to 12g represent that the function keys 21a and 21b are assigned a playback function, the function key 21c is assigned a setting function of a bookmark position, and the function key 21d is assigned a function of enlarging a display state, etc.

As described above, according to the present embodiment, even in the case where a keyboard is folded, and keys to be normally operated are directed to the display apparatus, desired application processing can be conducted by the operation of function keys.

Furthermore, the assignment of the functions to the respective function keys is changed in accordance with the operation state of applications, and the display control part 53 displays the assignment contents thereof in the display region 11, whereby a user can perform various operations in accordance with the applications while the keyboard apparatus 2 remains folded.

Furthermore, according to the present embodiment, the keys present on either surface of the keyboard apparatus become effective based on a tilt angle between the information processing apparatus body and the keyboard apparatus. Therefore, malfunction between the keys on the upper surface and those on the bottom surface can be prevented, and key malfunction caused by the shock during folding can be prevented.

In the present embodiment, in the case where the power is turned on under the condition that the keyboard apparatus is folded or in the case where the keyboard apparatus is folded from the state where the keyboard apparatus is opened with respect the display region under the condition that the power is on, an application to be started by a function key on a bottom surface is displayed so as to allow a user to select it. The present invention is not limited thereto. For example, in the case where the power is turned on under the condition that the keyboard apparatus is folded or in the case where the keyboard apparatus is folded from the state where the keyboard apparatus is opened with respect the display region under the condition that the power is on, a predetermined application (or an application that is previously set by a user) is automatically started, and the function of starting an application other than the predetermined application (or a menu display function for starting an application other than the predetermined application) may be assigned to the function key 21 on the bottom surface.

Embodiment 2

Figure 8A:
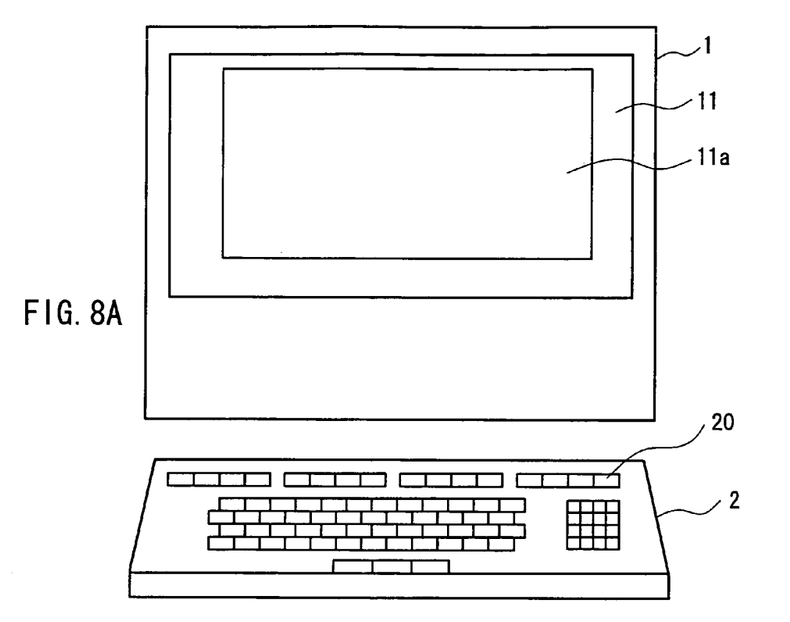
FIGS. 8A and 8B are front views showing an exemplary configuration of the information processing apparatus with a double-sided operable keyboard of another embodiment according to the present invention.
Figure 8B:
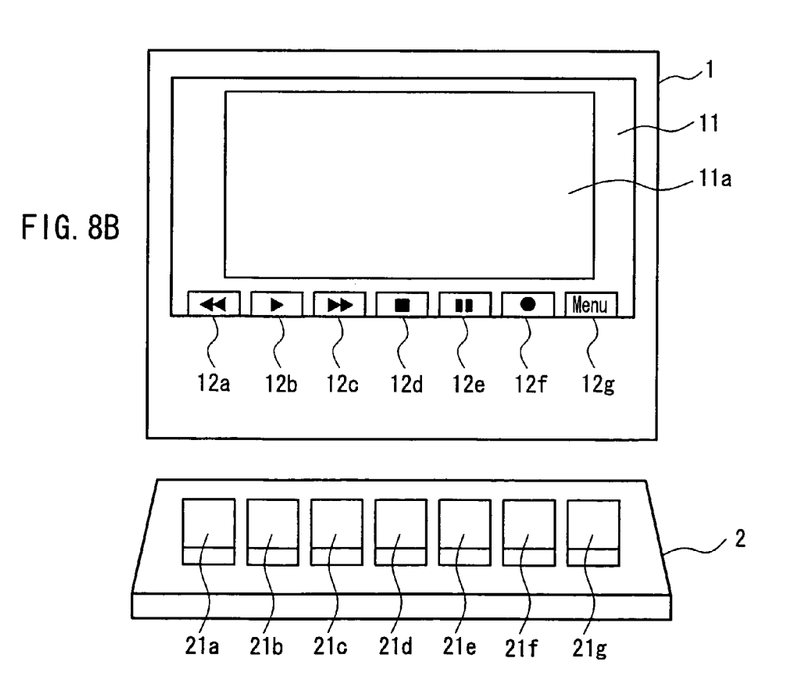

FIGS. 8A and 8B are front views showing a configuration of the information processing apparatus with a double-sided operable keyboard of another embodiment according to the present invention. The components having the same functions as those of the components described in Embodiment 1 are denoted with the same reference numerals as those therein, and the detailed description thereof will be omitted here.

The information processing apparatus according to the present embodiment can be used under the condition that the keyboard apparatus 2 is removed from the information processing apparatus body 1, as shown in FIGS. 8A or 8B. In this state, it is preferable that data is transmitted or received between the keyboard apparatus 2 and the information processing apparatus body 1, for example, by radio communication such as Bluetooth and IrDA. However, the present invention can be carried out even in a configuration in which the keyboard apparatus 2 is connected to the information processing apparatus body 1 with a cable as in a conventionally general information processing apparatus of a desktop type. The above-mentioned radio communication system is known, so that the detailed description thereof will be omitted.

The information processing apparatus of the present embodiment can be configured as a wall-hung thin apparatus or as a desktop type apparatus.

In the case where the information processing apparatus is used with the bottom surface of the keyboard apparatus 2 placed upward, as shown in FIG. 8B, only the function keys 21a to 21g on the bottom surface are enabled, and the functions assigned to the respective function keys 21a to 21g are displayed in the key display regions 12a to 12g of the display region 11. On the other hand, in the case where the information processing apparatus is used with the upper surface keys 20 of the keyboard apparatus 2 placed upward, as shown in FIG. 8A, only the upper surface keys 20 are enabled, and the key display regions 12a to 12g are not displayed in the display region 11.

Figure 9:
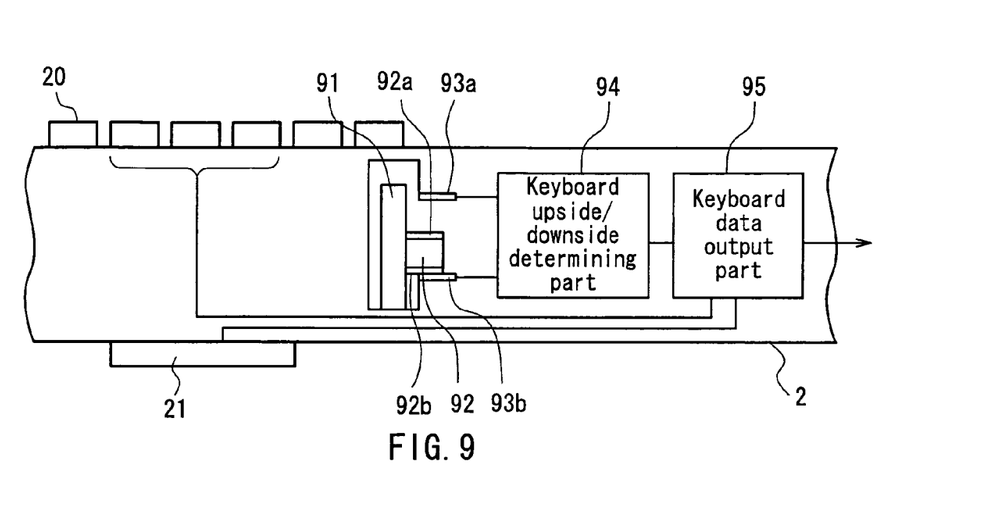
FIG. 9 is a schematic cross-sectional view showing an example of a mechanism of detecting the posture of a keyboard apparatus in the information processing apparatus with a double-sided operable keyboard of another embodiment according to the present invention.

Which surface of the keyboard apparatus 2 (i.e., the upper surface keys 20 or the function keys 21) is set to be placed upward can be detected, for example, by a mechanism as shown in FIG. 9. The configuration shown in FIG. 9 is merely an example, and the present invention is not limited to this specific example.

In the configuration shown in FIG. 9, there is a slider 91 provided slidably in a direction perpendicular to the surface of the keyboard apparatus 2 in a housing of the keyboard apparatus 2. An electrode holding member 92 is fixed to the slider 91, and electrodes 92a and 92b are respectively provided on both sides of the electrode holding member 92 in a direction in which the slider 91 is movable. A predetermined voltage (e.g., 5 V) is applied between the electrodes 92a and 92b. Furthermore, in the housing of the keyboard apparatus 2, electrodes 93a and 93b are provided at positions where they come into contact with the electrodes 92a and 92b when the slider 91 moves. Furthermore, the electrodes 93a and 93b are connected to a keyboard upside/downside determining part 94. More specifically, in the example shown in FIG. 9, a keyboard posture detecting part is composed of the slider 91, the electrode holding member 92, the electrodes 92a and 92b, the electrodes 93a and 93b, and the keyboard upside/downside determining part 94.

As shown in FIG. 9, in the case where the keyboard apparatus 2 is used with the upper surface keys 20 placed upward, as shown in FIG. 9, the slider 91 slides to the bottom surface (side on which the function keys 21 are provided) of the keyboard apparatus 2 due to the gravity, whereby the electrode 92b provided at the electrode holding member 92 comes into contact with the electrode 93b. On the other hand, in the case where the keyboard apparatus 2 is used in a state vertically opposite to that shown in FIG. 9, the slider 91 slides to the side on which the upper surface keys 20 are provided, whereby the electrode 92a provided at the electrode holding member 92 comes into contact with the electrode 93a.

Thus, the keyboard upside/downside determining part 94 detects which of the electrodes 93a and 93b is conducting, thereby determining which surface of the keyboard apparatus 2 is placed upward. A keyboard data output part 95 switches the transmission of a key input as effective data to the information processing apparatus by radio communication between the upper side keys 20 and the function keys 21 on the bottom surface, in accordance with the detection results of the keyboard upside/downside determining part 94. Furthermore, the determination results of the keyboard upside/downside determining part 94 are sent to the keyboard position detecting part 51 of the information processing apparatus via the keyboard data output part 95.

As described above, according to the present embodiment, even in the case where the double-sided operable keyboard apparatus can be removed from the information processing apparatus body, which surface of the double-sided operable keyboard apparatus is being used can be detected so as to enable the keys present on the surface that is being used.

In the configuration of the present embodiment, as described in Embodiment 1 with reference to FIGS. 6 to 8B, when the information processing apparatus starts an application program, the display state of the display region 11 is changed to the contents in accordance with the executed application, and the assignment of the functions to the respective function keys 21a to 21g are changed in accordance with the contents of the application.

Embodiment 3

Figure 10A:
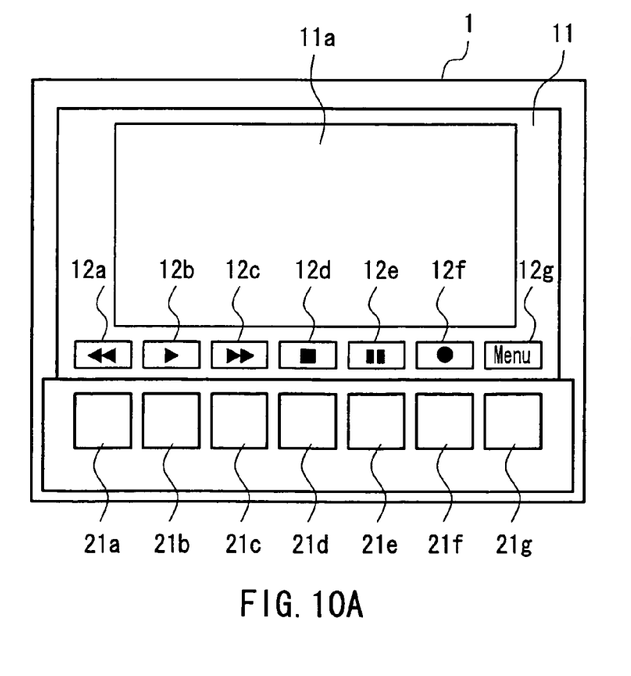
FIGS. 10A and 10B are front views showing an exemplary configuration of the information processing apparatus with a double-sided operable keyboard of still another embodiment according to the present invention.
Figure 10B:
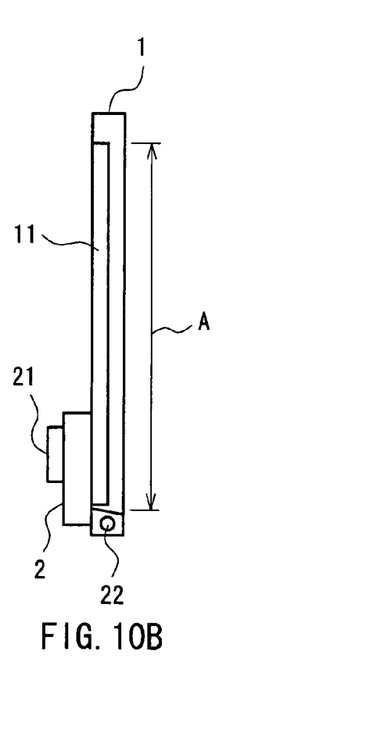
Figure 11A:
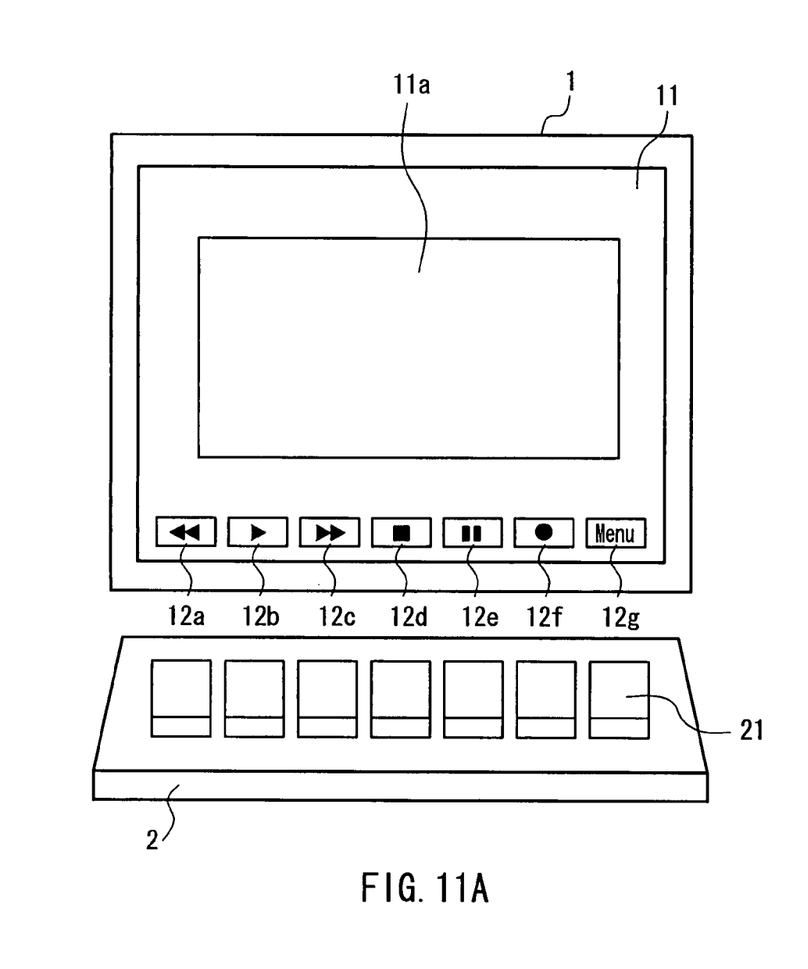
FIGS. 11A and 11B are front views showing an exemplary configuration of the information processing apparatus with a double-sided operable keyboard of still another embodiment according to the present invention.
Figure 11B:
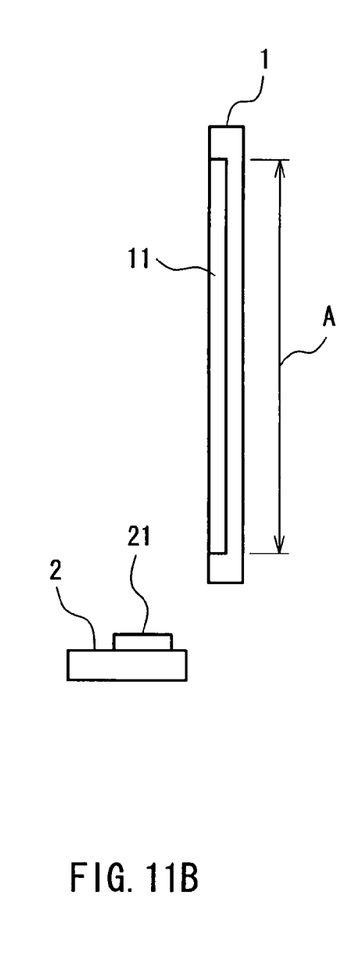

FIGS. 10A and 10B, and FIGS. 11A and 11B show configurations of the information processing apparatus with a double-sided operable keyboard of still another embodiment according to the present invention. FIGS. 10A and 11A are front views of the information processing apparatus with a double-sided operable keyboard of the present embodiment, and FIGS. 10B and 11B are right side views thereof. The components having the same functions as those of the components described in Embodiment 1 are denoted with the same reference numerals as those therein, and the detailed description thereof will be omitted here.

The information processing apparatus of the present embodiment can be used under the condition that the keyboard apparatus 2 is folded with respect to the display region 11 of the information processing apparatus body 1, as shown in FIGS. 10A and 10B, and can also be used under the condition that the keyboard apparatus 2 is removed from the information processing apparatus body 1, as shown in FIGS. 11A and 11B. In the state shown in FIGS. 11A and 11B, data is transmitted/received between the keyboard apparatus 2 and the information processing apparatus body 1, for example, by radio communication such as Bluetooth and IrDA.

The information processing apparatus of the present embodiment can be configured as a wall-hung thin apparatus or as a desktop type apparatus.

In the information processing apparatus of the present embodiment, as shown in FIGS. 10A and 10B, when the keyboard apparatus 2 is folded with respect to the information processing apparatus body 1, a part on a lower side of an opening range A (see FIG. 10B) of the display region 11 in a vertical direction is covered with the keyboard apparatus 2. When the keyboard position detecting part 51 detects this state, the input control part 52 enables the function keys 21, as described in Embodiment 1. Furthermore, the display control part 53 sets a region not covered with the keyboard apparatus 2 to be a displayable region, and arranges the application region 11a and the key display regions 12a to 12g in this region.

On the other hand, as shown in FIGS. 11A and 11B, when the keyboard apparatus 2 is removed from the information processing apparatus body 1 and used with the function keys 21 placed upward, the keyboard position detecting part 51 detects this state based on the determination results of the keyboard upside/downside determining part 94, as described in Embodiment 2, and enables the function keys 21. In this state, the keyboard apparatus 2 has been removed from the information processing apparatus body 1, so that the entire opening range A of the display region 11 in the vertical direction is used as a displayable region. Thus, the display control part 53 arranges the key display regions 12a to 12g on a lower side compared with FIG. 10A. A larger region in the display region 11 can also be assigned as the application region 11a.

The size of such a displayable region can be switched by changing the resolution of a screen with a graphic driver in the information processing apparatus.

Thus, in the information processing apparatus of the present embodiment, in the case where the function keys 21 are effective, whether or not the keyboard apparatus 2 covers a part of the display region 11 is detected by the keyboard position detecting part 51, and the arrangement of the key display regions 12a to 12g in the display region is changed in accordance with the detection results. Consequently, the displayable range of the display region 11 can be used effectively.

The above-mentioned Embodiments 1 to 3 are not intended to limit the present invention, and they can be varied in the scope of the present invention. For example, the number and shape of the function keys to be provided on the bottom surface of the keyboard apparatus may be different from those in the drawings referred to in each of the embodiments. Furthermore, the mechanism of detecting the position and direction of the keyboard apparatus is not limited to that disclosed in the present embodiment. A mechanical sensor, an optical sensor, or the like can be appropriately used.

Furthermore, in the above-mentioned respective embodiments, the information processing apparatus with a keyboard apparatus that is foldable so as to cover a lower part of the display region has been illustrated. However, the information processing apparatus with a double-sided operable keyboard apparatus, which is foldable so as to cover a left end of the display region, a right end of the display region, or an upper part of the display region, also belongs to the technical range of the present invention.

The present invention is useful as an information processing apparatus with a double-sided operable keyboard apparatus, which is capable of executing desired application processing by operating function keys, even in the case where a keyboard is folded and the keys to be normally operated are directed to a reverse side (e.g., a display apparatus side or a lower side) with respect to a user.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An information processing apparatus having a double-sided operable keyboard, comprising:
a display apparatus, a keyboard apparatus, and a keyboard position detecting part detecting a relative position of the keyboard apparatus with respect to the display apparatus, thereby switching operatively effective keys between keys on an upper surface of the keyboard apparatus and keys on a bottom surface of the keyboard apparatus, in accordance with a selectable position of the keyboard apparatus relatively to a display region of the display apparatus, wherein:
the information processing apparatus is a personal computer of a wall-hung type or a desktop type,
the keyboard apparatus is moveable between a folded position relatively to and covering a lower portion of the display region and an opened position, uncovering the lower portion of the display region,
the bottom surface of the keyboard apparatus is provided with at least one function key assigned an arbitrary function, and
the information processing apparatus further comprises a display control part, which is responsive to the keyboard position detecting part detecting the folded position of the keyboard apparatus to display a respective function for one of said at least one function key in a pre-assigned function assignment display region of the display region not covered by the keyboard apparatus in the folded position thereof relatively to and covering the lower portion of the display region and is responsive to the keyboard position detecting part detecting the opened position of the keyboard to display a respective function for one of said at least one function key in a pre-assigned function assignment display region of the lower portion of the display region.

2. The information processing apparatus with a double-sided operable keyboard according to claim 1, wherein the keyboard position detecting part detects a tilt angle between the keyboard apparatus and the display region of the display apparatus.

3. The information processing apparatus with a double-sided operable keyboard according to claim 2, wherein the keyboard apparatus is operable in a selected one of at least two states, including a first state, in which the keyboard apparatus is in the folded position relatively to, and covering, the lower portion of the display region and a second state, in which the keyboard apparatus is removed from the folded position, relatively to, and covering the display region of the display apparatus so that the bottom surface with the at least one function key thereon is oriented upwardly.

4. The information processing apparatus with a double-sided operable keyboard according to claim 3, wherein:
the keyboard apparatus is usable, further, in a third state in which the keyboard apparatus is removed from the display apparatus so that the bottom surface with the at least one function key formed thereon is placed downwardly;
the keyboard apparatus includes a keyboard posture detecting part for detecting which surface of the keyboard apparatus is placed upwardly; and
the information processing apparatus includes an input control part for switching the operational effective keys between the keys on the upper surface of the keyboard apparatus and the at least function key on the bottom surface of the keyboard apparatus, in accordance with detection results of the keyboard posture detecting part 5. The information processing apparatus with a double-sided operable keyboard according to claim 4, further comprising the display control part displaying functions assigned to the at least one function key in the display apparatus, only in a case where the bottom surface having the at least one function key is detected to be placed upwardly of the keyboard apparatus by the keyboard posture detecting part.

6. The information processing apparatus with a double-sided operable keyboard according to claim 3, further comprising the display control part setting a region not covered with the keyboard apparatus, in a display region of the display apparatus, to be a displayable region, in a case where the keyboard apparatus is in the first state, and the display control part sets an entire display region in the keyboard apparatus to be a displayable region, in a case where the keyboard apparatus is opened with respect to the display region of the display apparatus, in the second state.

7. The information processing apparatus with a double-sided operable keyboard according to claim 2, wherein start functions of at least one application are assigned to the at least one function key on the bottom surface of the keyboard apparatus.

8. The information processing apparatus with a double-sided operable keyboard according to claim 2, wherein after one application is started, operation functions with respect to the application are assigned to the at least one function key on the bottom surface of the keyboard apparatus.

9. The information processing apparatus with a double-sided operable keyboard according to claim 2, further comprising the display control part displaying functions assigned to the at least one function key on the bottom surface of the keyboard apparatus in the display apparatus.

10. The information processing apparatus with a double-sided operable keyboard according to claim 2, wherein the information processing apparatus is a wall-hung type.

11. The information processing apparatus with a double-sided operable keyboard according to claim 2, further comprising the display control part setting a region not covered with the keyboard apparatus, in a display region of the display apparatus, to be a displayable region, in a case where the keyboard apparatus is in the first state, and the display control part sets an entire display region in the keyboard apparatus to be a displayable region, in a case where the keyboard apparatus is opened with respect to the display region of the display apparatus.

12. The information processing apparatus with a double-sided operable keyboard according to claim 1, wherein the keyboard apparatus is operable in a selected one of at least two states including a first state, in which the keyboard apparatus is in the folded position relatively to, and covering, the lower portion of the display region and a second state, in which the keyboard apparatus is removed from the folded position, relatively to the display region of the display apparatus so that the bottom surface with at least one function key thereon is oriented upwardly.

13. The information processing apparatus with a double-sided operable keyboard according to claim 12, wherein:
the keyboard apparatus is usable, further, in a third state in which the keyboard apparatus is removed from the display apparatus so that the bottom surface with the at least one function key formed thereon is placed downwardly;
the keyboard apparatus includes a keyboard posture detecting part for detecting which surface of the keyboard apparatus is placed upwardly; and
the information processing apparatus includes an input control part for switching the operational effective keys between the keys on the upper surface of the keyboard apparatus and the at least one function key on the bottom surface of the keyboard apparatus, in accordance with detection results of the keyboard posture detecting part.

14. The information processing apparatus with a double-sided operable keyboard according to claim 13, further comprising the display control part displaying functions assigned to the at least one function key in the display apparatus, only in a case where the bottom surface having the at least one function key is detected to be placed upwardly of the keyboard apparatus by the keyboard posture detecting part.

15. The information processing apparatus with a double-sided operable keyboard according to claim 12, further comprising the display control part setting a region not covered with the keyboard apparatus, in a display region of the display apparatus, to be a displayable region, in a case where the keyboard apparatus is in the first state, and the display control part setting an entire display region in the display apparatus to be a displayable region, in a case where the keyboard apparatus is opened with respect to the display region of the display apparatus, in the second state.

16. The information processing apparatus with a double-sided operable keyboard according to claim 12, further comprising the display control part setting a region not covered with the keyboard apparatus, in a display region of the display apparatus, to be a displayable region, in a case where the keyboard apparatus is in the first state, and the display control part sets an entire display region in the keyboard apparatus to be a displayable region, in a case where the keyboard apparatus is opened with respect to the display region of the display apparatus.

17. The information processing apparatus with a double-sided operable keyboard according to claim 1, wherein start functions of at least one application are assigned to the at least one function key on the bottom surface of the keyboard apparatus.

18. The information processing apparatus with a double-sided operable keyboard according to claim 1, wherein after one application is started, operation functions with respect to the application are assigned to the at least one function key on the bottom surface of the keyboard apparatus.

19. The information processing apparatus with a double-sided operable keyboard according to claim 1, further comprising the display control part displaying a function assigned to the at least one function key on the bottom surface of the keyboard apparatus in the display apparatus.

20. An information processing apparatus having a double-sided operable keyboard, comprising:
a display apparatus, a keyboard apparatus, and a keyboard position detecting part detecting a relative position of the keyboard apparatus with respect to the display apparatus, thereby switching operatively effective keys between keys on an upper surface of the keyboard apparatus and at least one function key on a bottom surface of the keyboard apparatus, in accordance with first and second selectable positions of the keyboard apparatus relatively to a display region of the display apparatus; wherein, in the first selectable position, the keyboard is positioned relatively to and covering a lower portion of the display region and, in the second selectable position, the keyboard apparatus is opened, relatively to and uncovering the lower portion of the display region; and
the information processing apparatus further comprises:
an input control part switching the operational effective keys between the keys on the upper surface of the keyboard apparatus and the at least one function key on the bottom surface of the keyboard apparatus in accordance with detection results of the keyboard position detecting part;

a function key assignment storing part storing, for each function key, a corresponding function key assignment; and a display control part responsive to the keyboard position detecting part detecting the first selectable position of the keyboard apparatus to display a respective function for one of said at least one function key in a pre-assigned function assignment display region of the display region not covered by the keyboard apparatus in the first selectable position thereof relatively to and covering the lower portion of the display region and is responsive to the keyboard position detecting part detecting the second selectable position of the keyboard to display a respective function for one of said at least one function key in a pre-assigned function assignment display region of the lower portion of the display region.

* * * * *

UNITED STATES PATENT AND TRADEMARK OFFICE
CERTIFICATE OF CORRECTION

| | |
|---|---|
| PATENT NO. | : 7,499,029 B2 |
| APPLICATION NO. | : 10/638557 |
| DATED | : March 3, 2009 |
| INVENTOR(S) | : Yasushi Hara |

Page 1 of 1

It is certified that error appears in the above-identified patent and that said Letters Patent is hereby corrected as shown below:

Column 1, Line 6, change "10-331,502," to --10/331,502,--.

Column 12, Line 65, change "at least" to --at least one--.

Column 12, Line 67, change "part" to --part.--.

Signed and Sealed this

Fifteenth Day of September, 2009

David J. Kappos
*Director of the United States Patent and Trademark Office*